United States Patent
Hooshmand et al.

(10) Patent No.: US 10,497,072 B2
(45) Date of Patent: Dec. 3, 2019

(54) OPTIMAL BATTERY SIZING FOR BEHIND-THE-METER APPLICATIONS CONSIDERING PARTICIPATION IN DEMAND RESPONSE PROGRAMS AND DEMAND CHARGE REDUCTION

(71) Applicant: NEC Laboratories America, Inc., Princeton, NJ (US)

(72) Inventors: Ali Hooshmand, San Jose, CA (US); Seyyed Ali Pourmousavi Kani, San Jose, CA (US); Ratnesh Sharma, Fremont, CA (US); Shankar Mohan, Ann Arbor, MI (US)

(73) Assignee: NEC Corporation (JP)

( * ) Notice: Subject to any disclaimer, the term of this patent is extended or adjusted under 35 U.S.C. 154(b) by 399 days.

(21) Appl. No.: 15/416,810

(22) Filed: Jan. 26, 2017

(65) Prior Publication Data
US 2017/0256004 A1 Sep. 7, 2017

Related U.S. Application Data

(60) Provisional application No. 62/304,524, filed on Mar. 7, 2016.

(51) Int. Cl.
*G06Q 50/06* (2012.01)
*G05B 15/02* (2006.01)
*G06F 1/26* (2006.01)

(52) U.S. Cl.
CPC ............ *G06Q 50/06* (2013.01); *G05B 15/02* (2013.01); *G06F 1/263* (2013.01)

(58) Field of Classification Search
CPC combination set(s) only.
See application file for complete search history.

(56) References Cited

PUBLICATIONS

Chaouachi, et al., "Multiobjective Intelligent Energy Management for a Microgrid", IEEE Transactions on Industrial Electronics, Apr. 2013, pp. 1688-1699, vol. 60, No. 4.
Chen, et al., "Sizing of Energy Storage for Microgrids", IEEE Transactions on Smart Grid, Mar. 2012, vol. 3, No. 1, 8 pages.
Oudalov, et al., Sizing and Optimal Operation of Battery Energy Storage System for Peak Shaving Application, PowerTech 2007, Aug. 2007, pp. 621-625.
Ru et al., "Storage Size Determination for Grid-Connected Photovoltaic Systems", IEEE Transactions on Sustainable Energy, Jan. 2013, pp. 1-14.

(Continued)

*Primary Examiner* — Ryan A Jarrett
(74) *Attorney, Agent, or Firm* — Joseph Kolodka

(57) ABSTRACT

A system and method are provided. The system includes a processor. The processor is configured to receive power related data relating to power usage of power consuming devices at a customer site from a plurality of sources. The processor is further configured to generate object function inputs from the power related data. The processor is additionally configured to apply the generated object function inputs to an objective function to determine an optimal capacity for a battery storage system powering the power consuming devices at the customer site while minimizing a daily operational power cost for the power consuming devices at the customer site. The processor is also configured to initiate an act to control use of one or more batteries of the battery storage system in accordance with the optimal capacity for the battery storage system.

18 Claims, 6 Drawing Sheets

(56) References Cited

PUBLICATIONS

Tarasak, et al., "Demand Bidding Program and Its Application in Hotel Energy Management", IEEE Transactions on Smart Grid, Mar. 2012, vol. 3, No. 2.
Zhang, et al., "Robust Energy Management for Microgrids With High-Penetration Renewables", IEEE Transactions on Sustainable Energy, Oct. 2013, pp. 944-953, vol. 4, No. 4.

US 10,497,072 B2

OPTIMAL BATTERY SIZING FOR BEHIND-THE-METER APPLICATIONS CONSIDERING PARTICIPATION IN DEMAND RESPONSE PROGRAMS AND DEMAND CHARGE REDUCTION

RELATED APPLICATION INFORMATION

This application claims priority to 62/304,524 filed on Mar. 7, 2016, incorporated herein by reference in its entirety.

BACKGROUND

Technical Field

The present invention relates to battery storage systems and more particularly optimal battery storage systems to reduce the cost of electricity at a customer site.

Description of the Related Art

The cost of electricity for a facility can vary greatly based on location, operation times, and utility provider. The location can affect the need for electricity to heat or cool the facility, with warmer climates requiring more electricity needed for cooling in the summer months. The operation times of the facility affect the need for electricity since lights are needed when the facility is operating and more lights will be needed when operating at night. Utility providers affect the cost of electricity since they set the price for which the facility purchases the electricity, but utilities have different prices for peak hours, like during the hot day where more electricity is needed to cool a facility, versus off-peak hours, where demand is less because being after dark or outside a normal work day.

Utility providers can charge both a time of use (TOU) rate and a demand charge (DC) for electricity they provide. The TOU rates are the time dependent charges levied against the consumption of electricity, and the DC charge goes toward generation and distribution costs. Utility providers may also offer plans for discounted rates to facilities that sign-up to allow the utility provider to have the facility reduce electricity use during certain peak demand times. Some utility providers also offer discounts to facilities that have in-house energy generating systems.

SUMMARY

According to an aspect of the present principles, a method is provided that is performed on a processor. The method includes the processor receiving power related data relating to power usage of power consuming devices at a customer site from a plurality of sources. The method further includes the processor generating object function inputs from the power related data. The method also includes the processor applying the generated object function inputs to an objective function to determine an optimal capacity for a battery storage system powering the power consuming devices at the customer site while minimizing a daily operational power cost for the power consuming devices at the customer site. The method additionally includes the processor initiating an act to control use of one or more batteries of the battery storage system in accordance with the optimal capacity for the battery storage system.

According to another aspect of the present principles, a system is provided. The system includes a processor. The processor is configured to receive power related data relating to power usage of power consuming devices at a customer site from a plurality of sources. The processor is further configured to generate object function inputs from the power related data. The processor is additionally configured to apply the generated object function inputs to an objective function to determine an optimal capacity for a battery storage system powering the power consuming devices at the customer site while minimizing a daily operational power cost for the power consuming devices at the customer site. The processor is also configured to initiate an act to control use of one or more batteries of the battery storage system in accordance with the optimal capacity for the battery storage system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
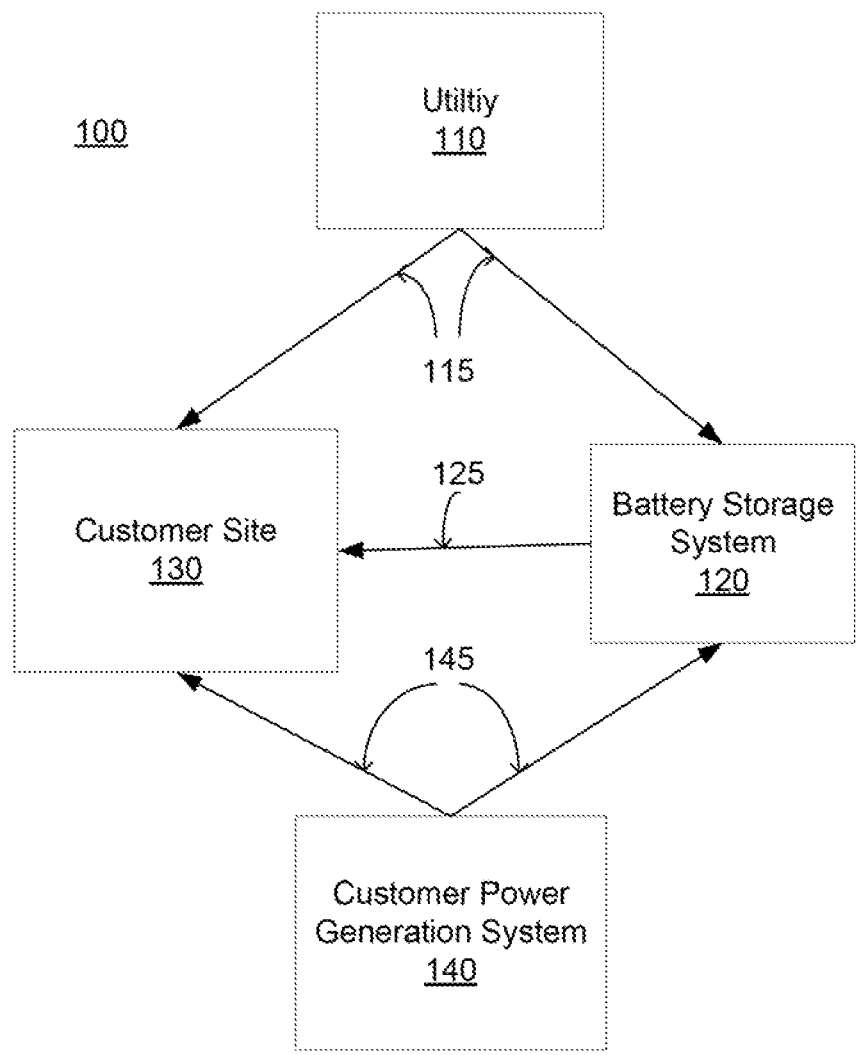
FIG. 1 is a block diagram illustrating a high-level customer site power system, in accordance with an embodiment of the present invention.

Battery size of a battery storage system (BSS) may be optimized to minimize daily operation cost. To do so, a cost function may be used that considers the operational cost of a microgrid (i.e., purchasing electricity from the grid and Demand Charges), cost of a battery (capital cost of the battery broken down to daily cost), and benefits for participating in demand response programs. Daily battery cycle is limited to a certain limit which calculated by considering a desired battery lifetime (in years).

Different inequality constraints are considered for safe operation of the microgrid, such as generation and demand balance, maximum and minimum battery state-of charge, maximum photovoltaic power generation availability.

Since benefiting from demand response programs is directly related to the customers' consumption over non-event-days, both event-days and non-event-days are optimized at the same time for a year.

A grid-connected micro-grid may be populated by a load, a PV installation and a battery storage system (BSS). It is assumed hereon that the PV installation is dispatchable. The basic PV power profile is scaled using the formula presented in Eqn. (1) in order to assess the impact of PV different sizes on the battery sizing:

$$P_{pv} = 2^{\frac{7 \cdot scale\_pv}{19}} \cdot P_{pv}^{shape} \quad (1)$$

where $P_{pv}$ denotes the scaled PV power, $P_{pv}^{shape}$ denotes the original PV profile, and scale_pv is the scaling factor.

The load's power profile is derived from available data. The static load profile provides information about half-hourly normalized energy consumption for all days in the year. The representative daily power profile is derived by averaging the data at the same hour across all days for the year as follows:

$$\hat{S}_{i,j} = \frac{S_{i,j}}{\sum_{j=1}^{24} S_{i,j}}$$

$$\tilde{S}_j = \frac{1}{366} \sum_{i=1}^{366} \hat{S}_{i,j},$$

where $S_{i,j}$ is the energy consumption of during the jth hour of day i.

The load profile is derived by scaling the normalized energy consumption by the daily energy throughput of $P_{l,i} = \tilde{S}_i \cdot$ load_level.

It is assumed that the following inequality hold by default, load_level>scale_pv, to ensure that the peak PV power output is very close to, if not less than the peak power demanded by the load.

The Battery Storage Systems under consideration may consist of LiFePo4 cells that have a nominal voltage of 3.3 V each and the BSS may be modular and scalable with each module having a capacity of 15 kWh. The entire BSS, regardless of its capacity may have a discharging and charge power limit of 1 MW. Finally, in an effort to reduce the number of integer variables in the subsequent optimization problems, the number of modules takes rational values. Finally, the state-of-charge (SOC) window in which the BSS operates may be limited to [10%, 100%] of the total capacity of the cell and the initial and terminal SOCs are at 50% of rated capacity.

The BSSs may include NEC Energy Solutions® batteries; NEC Energy Solutions® batteries can cost $1000/kWh. In comparison BSSs in the current market cost in the neighborhood of $500/kWh and according to reports by Navigant and DOE, the price of Li-ion based BSS is projected to drop to close to $150/kWh in 2023. In an effort to understand the significance of BSS Capex on the decision to invest in BSSs, the price projections above may be used to ascertain the viability of using Li-ion based BSSs.

The problem of sizing BSS systems consisting of batteries of the kind described above with an objective of reducing daily operational cost is described.

Problem $P_1$:

$$\min_{\Gamma} \langle TOU, P_g \rangle + DC(P_g) + n_s \cdot \text{Capex} \quad (2a)$$

$$P_{b,i} + P_{g,i} + P_{sl,i} = P_{l,i} \quad \forall i \in \mathbb{N}_{24} \quad (2b)$$

$$P_{sl,i} + P_{sd,i} + P_{sb,i} = P_{pv,i} \quad \forall i \in \mathbb{N}_{24} \quad (2c)$$

$$P_{b_{net},i} = P_{b,i} - P_{sb,i} \quad \forall i \in \mathbb{N}_{24} \quad (2d)$$

-continued $$C_{i+1} = C_i - P_{b_{net},i} \quad \forall i \in \mathbb{N}_{24} \quad (2e)$$

$$n_s \cdot c_{min} \le C_i \le n_s \cdot c_{max} \quad \forall i \in \mathbb{N}_{24} \quad (2f)$$

$$C_1 = C_{24} \quad (2g)$$

$$0 \le P_{g,i} \quad \forall i \in \mathbb{N}_{24} \quad (2h)$$

$$P_{b,min} \le P_{b,i} \le P_{b,max} \quad \forall i \in \mathbb{N}_{24} \quad (2i)$$

$$0 \le P_{sl,i} \le P_{pv,i} \quad \forall i \in \mathbb{N}_{24} \quad (2j)$$

$$0 \le P_{sd,i} \le P_{pv,i} \quad \forall i \in \mathbb{N}_{24} \quad (2k)$$

$$0 \le P_{sb,i} \le P_{pv,i} \quad \forall i \in \mathbb{N}_{24} \quad (2l)$$

where $n_s$ is the number of battery units; Capex is the daily capital cost of the battery; $P_{b,i}$, $P_{g,i}$, $P_{sl,i}$, $P_{l,i}$ are battery discharge power, power purchased from the grid, load demand response in reduction mode, and actual load demand consumption, respectively; $P_{sd,i}$, $P_{sb,i}$, $P_{pv,i}$ are PV dispatched power, PV power used to charge the battery, and actual PV power; $P_{b_{net},i}$ is the net BSS power; $C_i$, $C_{max}$, $C_{min}$ are battery state-of-charge at time i, upper and lower state-of-charge limits; $P_{b,max}$, $P_{b,min}$ are battery upper and lower net power limits; DC: $\mathbb{R}^{24} \to \mathbb{R}$ is defined as follows:

$$DC(P_g) = DC_{max} \cdot \|P_g\|_\infty + DC_{peak-max} \cdot \|P_{g,peak-hours}\|_\infty + DC_{off-peak-max} \cdot \|P_{g,off-peak-hours}\|_\infty, \quad (3)$$

where $P_g$, $P_{g,peak-hours}$, $P_{g,off-peak-hours}$ are vectors of the grid powers during the entire day, peak-hours, and partial-peak-hours; $DC_{max}$, $DC_{peak-max}$, $DC_{pp-max}$ are the rates associated with the entire day, peak, and partial-peak, respectively.

The objective of the optimization problem in Eqn. (2a), consists of three terms-TOU based energy charge, Demand Charge and BSS capex—and computes the total daily electricity bill. The cost of energy (TOU and DC rates) is computed. For simplicity, the daily capex of the BSS is computed by ignoring inflation; i.e. if the BSS is assumed to last $n_{years}$ years, then the daily capex associated with that BSS is given by, $$\text{Capex} = \frac{1,000,000}{365 \times n_{years}} \times \text{capex multiplier},$$

where a 1 MWh battery may cost $1,000,000 and the "capex multiplier" is a scaling factor that is useful to adjust the price of the BSS system to reflect the price points of interest.

Since the Demand Charge function, as presented, is convex but not linear, during implementation, the problem is transformed into a linear program by introducing auxiliary variable as follows. As the DC is computed based on the maximum power drawn during the entire day, peak period and part-peak period, we introduce three new variables that correspond to the maximum values. Let these decision variables be denoted by $P_{g,max}$, $P_{g,max-peak}$ and $P_{g,max-part-peak}$. Then, by re-writing the objective function as $\langle TOU, P_g \rangle + DC_{max} \cdot P_{g,max} + DC_{max-peak} \cdot P_{g,max-peak} + DC_{max-part-peak} \cdot P_{g,max-part-peak} + n_s \cdot \text{Capex}$, and adding the following constraints such that the desired transformation is obtained:

$$\langle TOU, P_g \rangle + DC_{max} \cdot P_{g,max} + DC_{max-peak} \cdot P_{g,max-peak} + DC_{max-part-peak} \cdot P_{g,max-part-peak} + n_s \cdot \text{Capex}$$

$$-P_{g,max} \le 0$$

$$-P_{g,max-peak} \le 0$$

$$-P_{g,max\text{-}part\text{-}peak} \le 0$$

$$P_{g,i} \le P_{g,max}$$

$$P_{g,i} \le P_{g,max\text{-}peak}$$

$$P_{g,i} \le P_{g,max\text{-}part\text{-}peak} \quad (4)$$

One of the key conservation laws that needs to be upheld when writing energy/power optimization problems is power balance. Constraints (2b) and (2c) ensure that the desired power by the load is provided and that all power generated by PV system is either channeled into the battery, used to support the load or is dispatched.

Constraints in Eqns. (2e) and (2f) are related to dynamics of the BSS with the former describing the evolution of SOC and the latter ensuring that the SOC of the BSS remains bounded within pre-specified fractions ($C_{min}$ and $C_{max}$) of the total capacity of the BSS. Note that since we define SOC in terms of the remaining energy, the bounds are dependent on the number of battery modules, $n_s$ and the total capacity of the BSS is computed as $n_s \cdot C_{rated}$ where $C_{rated}$ is the rated capacity (in kWh) of each module.

Finally, since the optimization is being performed on daily power profiles, that the entire operation is charge sustaining is enforced by constraint (2g). The other constraints, 2(h)-2(k), are related to the operating bounds on the power from every component in the network.

The feasibility of using BSSs to help reduce daily operating cost for varying values of Capex, total load levels and different extents of PV penetration. The value of BSS Capex may be drawn from the set {150, 200, 300, 500, 1000} $/kWh, the effective life of the BSS is estimated using Problem A.

From the moment batteries are put-together, batteries start to degrade. The reduction in the state-of-health (SOH) of batteries typically manifests itself as either as an increase in its internal resistance (thereby reducing its efficiency) or a reduction in the amount of energy that can be stored in it. The rate of degradation has been, experimentally, found to be dependent on four factors—age of the battery, temperature of operation, C-rate of current and SOC of the battery. Models that attempt to model degradation can be empirically derived. An illustrative model was developed by NEC Energy Solutions®, and is presented below:

$$q_T = 1 - k_1 |E|^{k_2} - j_1 T^{j_2}, \quad (5)$$

where E is the total energy throughput of the battery in MWh, T is the age of the battery in days and $q_T$ is the fraction of remaining capacity; the values of the various coefficients can include $k_1$ in the range of between about $2 \times 10^{-9}$-$3 \times 10^{-9}$, $k_2$ between about 1-3, $j_1$ between about $2 \times 10^{-4}$-$4 \times 10^{-4}$ and $j_2$ between about 0.2 to about 0.9. The coefficients depend on the experimental battery degradation data where $k_1$ and $k_2$ relate the battery total energy throughput to the battery degradation, and $j_1$ and $j_2$ model the calendar aging part of the total degradation of the battery.

Since the optimization problem in $P_1$ is not affected by the increase in internal resistance of the BSS (since efficiency of the BSS is not a part of the formulation, but could be included), the impact of BSS degradation is assumed to manifest itself as a change in the window of SOC operation. In scaling $C_{max}$ by the remaining capacity of the BSS, the window over which SOC is allowed to vary is reduced. Note that the lower limit of this window is not changed. Upon updating the capacity, for any subsequent day, problem $P_1$ is solved with the modified constraint until the next capacity update. This cycle of updating and re-solving the optimization is continued until the remaining SOC falls below 65% of the original capacity; Problem A summarizes the life estimation function.

Problem A: Estimating the life-time of BSS
Data: BSS capacity (Q*)
Result: Predicted life of BSS
While $Q^+ \ge 0.65 \ge Q^*$ do
   Scale the upper limit of SOC by $Q^+/Q^*$;
   Solve daily power management problem;
   Compute daily degradation ($\delta Q$);
   Update $Q^+$: $Q^+ = Q^+ - \delta Q$;
end If it is desired that the BSS have an estimated life of n days, the maximum daily energy-throughput (assuming that energy-throughput is the same daily) can be computed by inverting the degradation model in Eqn. (5).

$$E^* = \exp\left(\frac{1}{k_2}\log\left(\frac{1}{k_1}(1 - q_T - j_1 n^{j_1})\right) - \log(n)\right) \quad (6)$$

That the daily energy throughput of the BSS not exceed E* can be enforced by introducing new variables and adding additional constraints. The newly introduced variables attempt to decompose the sequence of battery powers $P_b$ into its positive ($P_{bnet}^+$) and negative parts ($P_{bnet}^-$). Since $P_1$ considers a problem in which the day is segmented into hours, the total energy throughput of the battery is given by the $l_1$ norm of $P_b$; i.e. $P_{bnet}^+ - P_{bnet}^-$. The decomposition of $P_b$ and the energy throughput constraints can be mathematically represented as follows:

$$-P_{bnet,i}^+ \le 0 \qquad \forall i \in \mathbb{N}_{24} \quad (7)$$

$$P_{bnet,i}^- \le 0 \qquad \forall i \in \mathbb{N}_{24}$$

$$P_{bnet,i}^+ + P_{bnet,i}^- \le P_{bnet,i} \qquad \forall i \in \mathbb{N}_{24}$$

$$-P_{bnet,i}^+ \le -P_{bnet,i} \qquad \forall i \in \mathbb{N}_{24}$$

$$P_{bnet,i}^- \le P_{bnet,i} \qquad \forall i \in \mathbb{N}_{24}$$

$$P_{bnet,i}^+ \cdot P_{bnet,i}^- = 0 \qquad \forall i \in \mathbb{N}_{24}$$

$$\sum_{i=1}^{24} P_{bnet,i}^+ - P_{bnet,i}^- \le E^*,$$

where Eqn. (7) is a complementarity constraint that ensures that the positive and negative portions of $P_{bnet,i}$ are both not non-zero simultaneously. E* is the limit on daily maximum number of cycles derived as the inverse of the degradation model and using the desired life, n (in days), of the BSS. Associated with this set of constraint, regularizing cost (to avoid unnecessary battery usage) is required. That is, by writing the objective as, $$\langle TOU, P_g \rangle + DC_{max} \cdot P_{g,max} + DC_{max\text{-}peak} \cdot P_{g,max\text{-}peak} +$$

$$DC_{max\text{-}part\text{-}peak} \cdot P_{g,max\text{-}part\text{-}peak} + n_s \cdot \text{Capex} + \gamma_4 \sum_{i=1}^{24} p_{bnet,i}^+,$$

where $\gamma_i$ is a small number (for instance 0.001). We penalize the $P_{bnet}^+$ alongside the other constraints to ensure that a proper decomposition is obtained. Having appended $P_1$ with these constraints, the steps in Problem A is repeated, only this time, with the knowledge that the chosen BSS will enjoy the sticker-life. The new optimization problem guarantees at least sticker-life of the BSS, and the actual computed life can exceed the desired life.

Influencing of the required minimum life of the BSS, the peak PV power output is almost equal to the peak power demanded by the load. The changing contribution of PV installation to the total load is more significant, the daily savings are higher, even when the capex is large. As the Capex starts to decrease, the shape of the savings-load curve get a bit more interesting-resembling a parabola. This observation can be ascribed to the fact that the bulk of PV energy is generated during the peak period, this period has the highest penalty on the energy and demand charge. With the need to provide power during the peak period diminished, the BSS is put in better use to reduce the demand charge during the part-peak periods by charging during the off-peak periods and compensating during the part-peak periods.

Utility providers offer many different Demand Response (DR) programs to businesses, a Demand Bidding Program (DBP) and a Scheduled Load Reduction Program (SLRP) are two DR programs. These programs do not require a reduction in total load, provide a longer notice for 'events,' and have larger incentives.

The DBP is not to be confused with demand bidding as commonly described in literature; the latter refers to the participation of a user in an energy market requesting to meet energy needs, and the former is a penalty free promise to reduce the load by a user-determined amount. Participants in DBP are given a day ahead notice of the impending 'event' and are asked to indicate the time of the day during which the participant will reduce the load seen by the grid and the amount of reduction in load. In return for their participation, participants receive a reward for actual energy reduction without any financial penalty for failure to deliver on their promise of load reduction. To get paid, the participant is required to reduce the load (power) by an amount for a certain period; wherein the reduction is computed by comparing the load during the event and the baseline. The baseline for DBP, at its simplest, is computed as the hourly average of the loads over ten (10) previous similar days (weekdays) excluding event-days and holidays. Since there shall be at most one event every day lasting no more than eight hours and no less than four hours (contiguously between 6:00 hrs and 22:00 hrs), daily participation in DBP cannot exceed eight hours.

SLRP is a binding contract to reduce the load seen by the grid by a user-determined amount during every event period between the months of June and September. Under this program, the participant commits to reduce their load during at most three events every week. Three (3), non-overlapping SLRP events occur every day between 8:00 hrs and 20:00 hrs with each lasting four (4) hours and the customer is restricted to choosing to participate in at most one event each day with the additional constraint that no more than two chosen events can occur at the same times of the day every week. Events in which the customer elects to participate is chosen before June and is enforced every week until the end of September.

The battery sizing optimization may be formulated with DR programs in mind. There is one key difference between the new problem and $P_1$—the fact that rewards for participation in DR are computed based on a baseline. Once the BSS is installed, in all likelihood, it will be used whenever possible to reduce the economic burden that is purchasing electricity; that is, during non-event-days, the BSS will alter the effective profile of grid power—that which serves as a baseline for event-days. Thus, when sizing the BSS, and the subsequent power management strategy, both event and non-event-days must be simultaneously considered; the following optimization problem $P_2$ addresses this problem.

The objective of the optimization problem under consideration can be represented as, Problem $P_2$:

$$J = \lambda \cdot \left( \langle TOU, P_g^{DR} \rangle + \right.$$
$$DC(P_{g,max}^{DR}, P_{g,max-peak}^{DR}, P_{g,max-part-peak}^{DR}) + \gamma_4 \sum_{i=1}^{24} P_{bnet,i}^{+DR} \right) +$$
$$(1-\lambda) \cdot \left( \langle TOU, P_g^{no-DR} \rangle + DC(P_{g,max}^{no-DR}, P_{g,max-peak}^{no-DR}, \right.$$
$$\left. P_{g,max-part-peak}^{no-DR}) + \gamma_4 \sum_{i=1}^{24} P_{bnet,i}^{+no-DR} \right) -$$
$$DR_{reward} \cdot \left( P_{g-pick}^{no-DR} - P_{dr} \right) + n_s \cdot \text{Capex},$$
(8)

where $\lambda (\in [0,1])$ is the relative weight that penalizes the operational cost on event days; superscripts no-DR and DR correspond to variables that belong to non-event days and event days respectively. The coefficient $DR_{reward}$ is the reward earned for participating in $\mathbb{R}$ demand response and is in the unit \$/kW. The function DC: $\mathbb{R}^{24} \to \mathbb{R}$ computes the demand charge based on the peak values of power during different segments of the day, much like in Problem $P_1$. $P_{g\text{-}pick}^{no-DR}$ is a vector that isolates the grid power during a non-event day during hours that is incident with the period of participation in DR during an event day; simply put, $P_{g\text{-}pick}^{no-DR}$ serves as the baseline which will be used to compute the reward for participating in DR. Finally, $\gamma_4$ is a small coefficient that allows for the proper decomposition of $P_{bnet}$ as discussed above.

One of the major factors that helps distinguish the new problem from $P_1$ is the need to ensure that participation in demand response is restricted to certain periods of the day, with constraints on the maximum and minimum number of consecutive hours of participation. These constraints can be mathematically represented as, $$u_{dr_s,i} - u_{dr_e,i} = u_{dr,i} - u_{dr,i-1} \quad \forall i \in \mathbb{N} \setminus \{1\} \tag{9a}$$

$$u_{dr_s,i} + u_{dr_e,i} \leq 1 \quad \forall i \in \mathbb{N}_{24} \tag{9b}$$

$$u_{dr_s,i} \leq u_{dr,i+k} \quad \forall i \in \mathbb{N}_{24}, k \in \{j \in \mathbb{N}_{24} | i+j \leq 24\} \tag{9c}$$

$$u_{dr_e,i} \leq 1 - u_{dr,i+k} \quad \forall i \in \mathbb{N}_{24}, k \in \{j \in \mathbb{N}_{24} | i+j \leq 24\} \tag{9d}$$

$$u_{dr,i} \leq u_{g,i}, \quad \forall i \in \mathbb{N}_{24} \tag{9b}$$

where $u_{dr_s,i}$ and $u_{dr_e,i}$ are binary variables that serve as indicators of the start and end hours of participating in the DR programs. The variable $u_{dr}$ is a binary variable that takes the value 1 during the period of participation and is 0 at other times. $u_{g,i}$ is a binary variable that takes a value 1 when grid power is drawn.

Since each of the DR programs under consideration has a minimum on the amount by which the grid power must be reduced during the DR participation period, the next constraints represent those necessary conditions.

$$0 \le P_{g,i}^{DR} - P_{dr,i} \le M(u_{g,i} - u_{dr,i}) \; \forall i \in \mathbb{N}_{24} \quad (10a)$$

$$P_{dr,i} \le K u_{dr,i} \; \forall i \in \mathbb{N}_{24} \quad (10b)$$

$$10 \cdot u_{dr,i} \le P_{g\text{-}pick,i} - P_{dr,i}^{DR} \; \forall i \in \mathbb{N}_{24} \quad (10c)$$

Constraints in Eqns. (10a) stands to ensure that when participating in DR, the grid power $P_g$ must be identical to $P_{dr}$; that is to say that $P_{dr}$ represents the grid power during the period when participating in DR. Obviously, $P_{dr}$ has to be zero when $u_{dr}$ is zero and this is enforced by Eqn. (10b). The constraint in Eqn. (10c) is in place to ensure that the minimum reduction in grid power as mandated by the DR program is met. The scaling factor in Eqn. (10c) is the minimum per-hour reduction in power (in kW) as mandated by DBP specifications; for SLRP, this number needs to be changed to 100.

To isolate the baseline that will be used to compute the reward for participating in demand response, we introduce another vector labeled $P_{g\text{-}pick}^{no\text{-}DR}$. The following constraints perform the task of isolating the grid power during a non-event-day during the same period when the system participates in DR during an event period.

$$-P_{g\text{-}pick,i} \le 0 \; \forall i \in \mathbb{N}_{24} \quad (11a)$$

$$P_{g\text{-}pick,i} \le K u_{dr,i} \; \forall i \in \mathbb{N}_{24} \quad (11b)$$

$$P_{g\text{-}pick,i} \le P_{g,i}^{no\text{-}DR} \; \forall i \in \mathbb{N}_{24} \quad (11c)$$

$$P_{g,i}^{no\text{-}DR} - P_{g\text{-}pick,i} \le M(u_{g,i}^{DR} - u_{dr,i}) \; \forall i \in \mathbb{N}_{24} \quad (11d)$$

Finally, we have the usual constraints on power balance, SOC limits and power limits, $$C_{i+1}^\zeta = C_i^\zeta - P_{b_{net},i}^\zeta \; \forall i \in \mathbb{N}_{24}, \zeta \in \{no\text{-}DR, DR\} \quad (12a)$$

$$P_{b,i}^\zeta + P_{g,i}^\zeta + P_{sl,i}^\zeta = P_{l,i}^\zeta \; \forall i \in \mathbb{N}_{24}, \zeta \in \{no\text{-}DR, DR\} \quad (12b)$$

$$P_{sl,i}^{DR} + P_{sd,i}^{DR} + P_{sb,i}^{DR} = P_{pv,i}^\zeta \; \forall i \in \mathbb{N}_{24}, \zeta \in \{no\text{-}DR, DR\} \quad (12c)$$

$$P_{b_{net},i}^\zeta = P_{b,i}^\zeta - P_{sb,i}^\zeta \; \forall i \in \mathbb{N}_{24}, \zeta \in \{no\text{-}DR, DR\} \quad (12d)$$

$$n_s \cdot c_{min} \le C_i^\zeta \le n_s \cdot c_{max} \; \forall i \in \mathbb{N}_{24}, \zeta \in \{no\text{-}DR, DR\} \quad (12e)$$

$$C_1 = C_{24} \quad (12f)$$

$$0 \le P_{g,i}^\zeta \; \forall i \in \mathbb{N}_{24}, \zeta \in \{no\text{-}DR, DR\} \quad (12g)$$

$$P_{b,min} \le P_{b,i}^\zeta \le P_{b,max} \; \forall i \in \mathbb{N}_{24}, \zeta \in \{no\text{-}DR, DR\} \quad (12h)$$

$$0 \le P_{sl,i}^\zeta \le P_{pv,i} \; \forall i \in \mathbb{N}_{24}, \zeta \in \{no\text{-}DR, DR\} \quad (12i)$$

$$0 \le P_{sd,i}^\zeta \le P_{pv,i} \; \forall i \in \mathbb{N}_{24}, \zeta \in \{no\text{-}DR, DR\} \quad (12j)$$

$$0 \le P_{sb,i}^\zeta \le P_{pv,i} \; \forall i \in \mathbb{N}_{24}, \zeta \in \{no\text{-}DR, DR\} \quad (12k)$$

In line with the discussion above about clamping the daily energy throughput of the BSS every day, the following constraints are introduced.

$$-P_{b_{net},i}^{+\zeta} \le 0 \qquad \forall i \in \mathbb{N}_{24}, \zeta \in \{no - DR, DR\} \quad (13a)$$

$$P_{b_{net},i}^{-\zeta} \le 0 \qquad \forall i \in \mathbb{N}_{24}, \zeta \in \{no - DR, DR\} \quad (13b)$$

$$P_{b_{net},i}^{+\zeta} + P_{b_{net},i}^{-\zeta} = P_{b_{net},i}^\zeta \qquad \forall i \in \mathbb{N}_{24}, \zeta \in \{no - DR, DR\} \quad (13c)$$

$$-P_{b_{net},i}^{+\zeta} \le -P_{b_{net},i}^\zeta \qquad \forall i \in \mathbb{N}_{24}, \zeta \in \{no - DR, DR\} \quad (13d)$$

$$P_{b_{net},i}^{-\zeta} \le P_{b_{net},i}^\zeta \qquad \forall i \in \mathbb{N}_{24}, \zeta \in \{no - DR, DR\} \quad (13e)$$

$$\sum_{i=1}^{24} P_{b_{net},i}^{+\zeta} - P_{b_{net},i}^{-\zeta} \le E^* \qquad \forall \zeta \in \{no - DR, DR\} \quad (13f)$$

Additionally, since the objective function is not strictly a sum of positive quantities, there is a need to ensure that the resulting solution does not culminate in negative savings. Negative savings are likely to manifest themselves on non-event-days when the potential for increasing savings during event-days comes at the expense of operational cost on non-event-days. This situation is avoided by introducing the following constraint which ensures that the operation cost during the non-event-day is not any more than when not using a BSS, $$\langle TOU, P_g^{no-DR} \rangle + \overline{DC}(P_{g,max}^{no-DR}, P_{g,max\text{-}peak}^{no-DR}, P_{g,max\text{-}part\text{-}peak}^{no-DR}) +$$

$$\gamma_4 \sum_{i=1}^{24} P_{bnet,i}^{+no-DR} + n_s \cdot \text{Capex} \le \langle TOU, P_{bl} \rangle + DC(P_{bl})$$

where $P_{bl,i} = \max(P_{l,i} - P_{pv,i}, 0)$. Finally, there are specific constraints that relate to the hours of operation. With the above constraints and cost, the optimization problem is formulated and shall hereon be referred to as Problem $P_2$.

Based on the above formulation and the information provided about the DR programs above, the individual cases of DBP and SLRP can be used to calculate the optimum BSS. In doing so, it is assumed $\lambda$ in $P_2$ takes the value 0.13. This value is chosen to ensure that as much weight as possible be allocated to non-event days since event days tend to few and far between.

Using the version of the problem in which the BSS energy-throughput is constrained to ensure at least sticker life, there is expected savings during both non-event-days and event days for varying values of capex, load levels and PV penetration. In this case, the savings of the non-event-day is computed as follows, $$\text{Percent savings} = \quad (14)$$

$$100 \times \frac{Op.\ \text{cost without}\ BSS - Op.\ \text{cost with}\ BSS}{\text{Operational cost without}\ BSS},$$

while on an event-day savings are computed as, $$\text{Percent savings} = \quad (15)$$

$$100 \times \frac{Op.\ \text{cost on}\ n.e.d\ \text{with}\ BSS - Op.\ \text{cost on}\ e.d\ \text{with}\ BSS}{\text{Operational cost on}\ n.e.d\ \text{with}\ BSS},$$

with n.e.d=Non-Event-Day and e.d=Event-Day.

Co-optimization reduces the achievable savings on any non-event-day. Secondly, on an event-day, the effective savings computed using Eqn. (15) is almost independent of Capex for BSS that cost less than $500/kWh; i.e. moving forward in time—as BSS capex decreases—participating in DR need not be the first priority when sizing the BSS, ceteris paribus. Finally, mirroring the conclusion above, having significant PV installations will most certainly help to increase daily savings as the load level increases.

Whilst participating in DBP will increase the effective daily savings, to ascertain if participating in SLRP—a more scheduled program that can ensure systematic rewards—a different approach is adopted in an effort to reduce the computational complexity.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a customer site power system 100 is illustratively shown. The customer site power system 100 includes a utility 110. The utility 110 provides power thru the powerlines 115. The customer site 130 is connected to the powerlines 115 to get power from the utility 110. The customer site has a battery storage system 120. The battery storage system 120 gets power from the powerlines 115. The battery storage system 120 also get power from the customer powerlines 145. The customer powerlines 145 have power provided by the customer power generation system 140. In one embodiment, the customer generation system 140 may include one or more photovoltaic system (see, e.g. FIG. 2), a wind farm system, a hydroelectric system, a biomass system, and a geothermal system. The customer generation system 140 provides power to the customer site 130 through the customer powerlines 145. When the utility 110 offers an incentive for the customer site 130 to reduce power consumption, the customer site 130 can get power from the battery storage system 120 through a BSS powerline 125.

Figure 2:
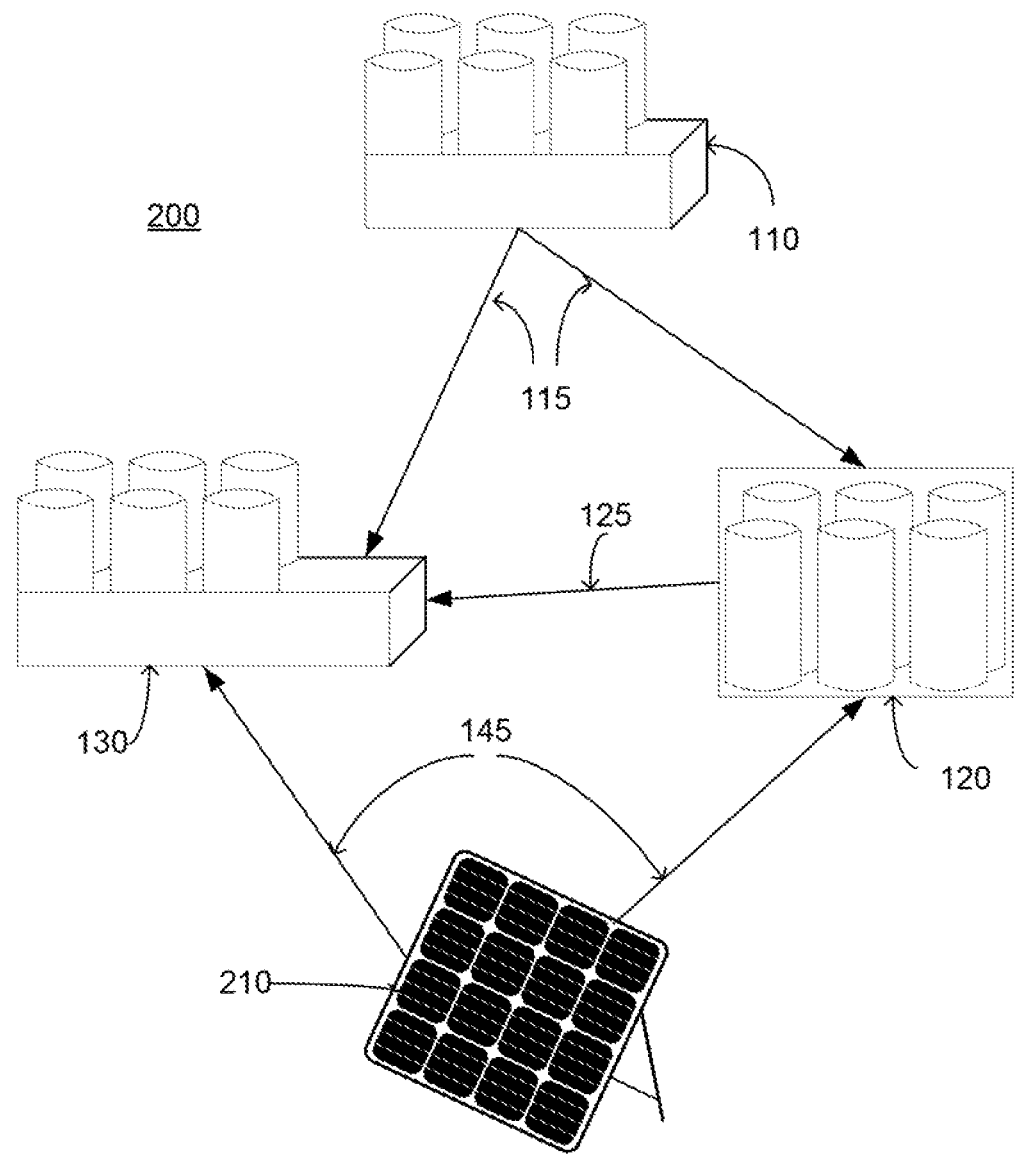
FIG. 2 is a block diagram illustrating a customer site power system, in accordance with an embodiment of the present invention.

Referring to FIG. 2, a customer site power system 100 is illustratively shown. The customer site power system 200 includes a utility 110. The utility 110 provides power along powerlines 115. The customer site 130 is connected to the powerlines 115 to get power from the utility 110. The customer site has a battery storage system 120. The battery storage system 120 gets power from the powerlines 115. The battery storage system 120 also get power from the customer powerlines 145. The customer powerlines 145 have power provided by the photovoltaic system 210. The photovoltaic system 210 provides power to the customer site 130, through the customer powerlines 145. When the utility 110 offers an incentive for the customer site 130 to reduce power consumption, the customer site 130 can get power from the battery storage system 120 through the BSS powerline 125, if the photovoltaic system 210 is not generating enough power.

Figure 3:
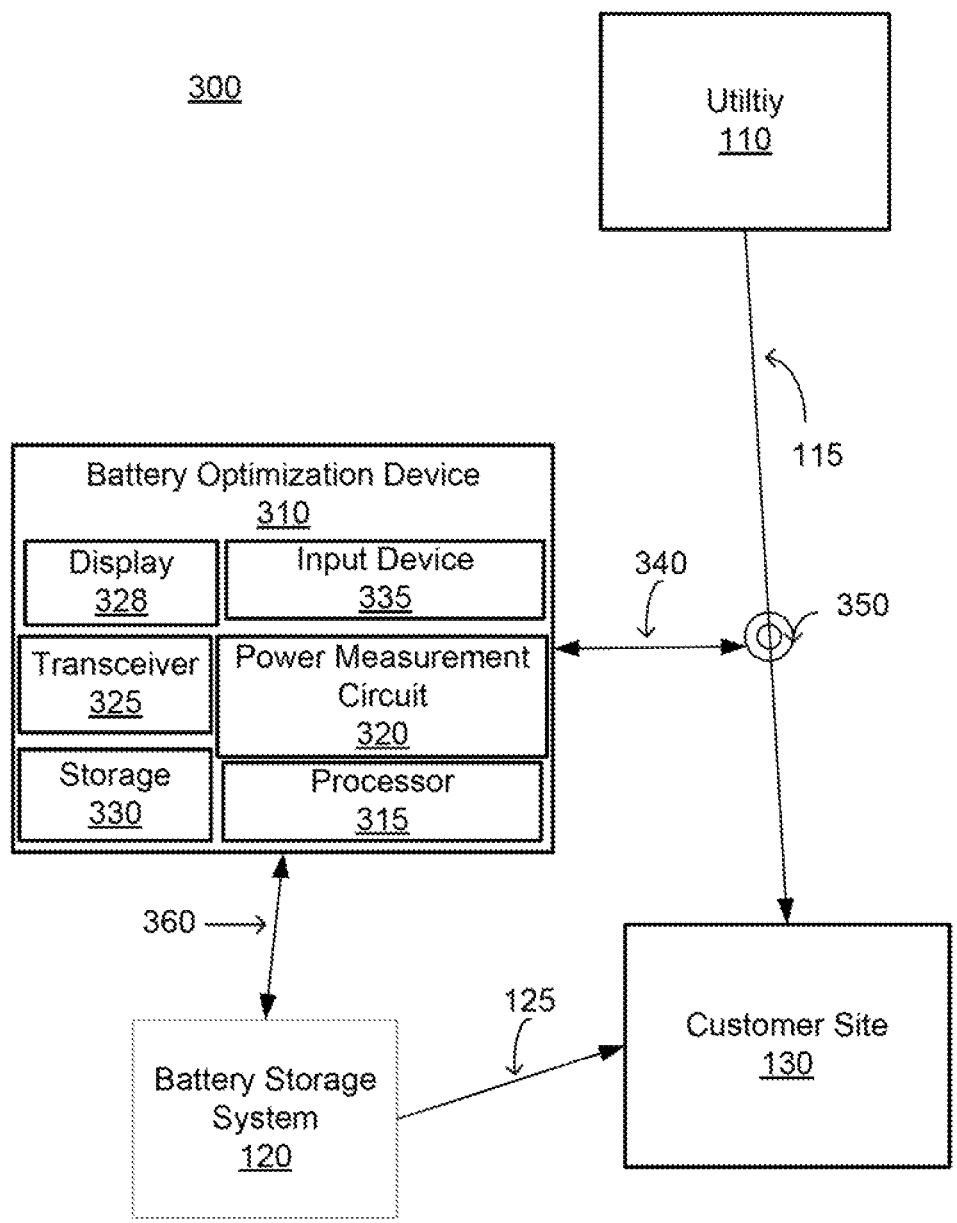
FIG. 3 is a block diagram illustrating a system using a battery optimization device, in accordance with an embodiment of the present invention.

Referring to FIG. 3, a system 300 using a battery optimization device 310 is illustratively shown. The system 300 includes a utility 110. The utility 110 provides power along powerlines 115. The customer site 130 is connected to the powerlines 115 to get power from the utility 110. The customer site 130 has a battery storage system 120. When the utility 110 offers an incentive to reduce power use by the customer site 130, the customer site 130 can get power from the battery storage system 120 through the BSS powerline 125. The system includes a battery optimization device 310.

The battery optimization device 310 may include one or more processors (hereafter "processor") 315. The processor 315 could process sensor or input data of the battery optimization device 310. The processor 315 could process data received from the utility 110. The battery optimization device 310 may include one or more displays (hereafter "display") 328 and one or more input devices (hereafter "input device") 335. The input device 335 could be used to accept user commands or data into the battery optimization device 310.

The battery optimization device 310 may include one or more power measurement circuits 320 for making different measurements. The measurements may include voltage or current. In one embodiment, the one or more power measurement circuits 320 may include a clamp style ammeter. In another embodiment, the one or more power measurement circuits 320 may include an inline ammeter or a voltmeter. In one embodiment, the one or more power measurement circuits 320 may have a measurement link 340 to the powerline 115. The measurement link 340 connects to the powerline 115 at a measurement junction 350. The measurement junction 350 may be an inline junction in the powerline 115 or a clamp around the powerline 115. The measurement link 340 may carry voltage or current measurements to the battery optimization device 310.

The battery optimization device 310 may include a transceiver 325. In one embodiment, the transceiver 325 may be equipped to communicate over powerlines 115. In this way, the battery optimization device 310 can communicate with the utility 110. In another embodiment, the transceiver 325 may include a WIFI or equivalent radio system, a cellular network system, a local area network, a wide area network, or other network communication system. In one embodiment, the transceiver 325 communicates with the battery storage system 120 over a communication link 360 to send commands to the battery storage system 120. The commands sent to the battery storage system 120 may include operational control commands to instruct the battery storage system to provide power to the customer site 130.

The battery optimization device 310 may include storage 330. The storage 330 may include a disk storage device (e.g., a magnetic or optical disk storage device), a solid state magnetic device, and so forth. The storage 330 may work in conjunction with other systems on the battery optimization device 310 to record data, run algorithms or programs, control the battery optimization device 310, etc. The storage 330 may include a Read Only Memory (ROM), random access memory (RAM), or any other type of memory useful for the present applications. In one embodiment, the storage 330 may include the Objective Function Software.

Figure 4:
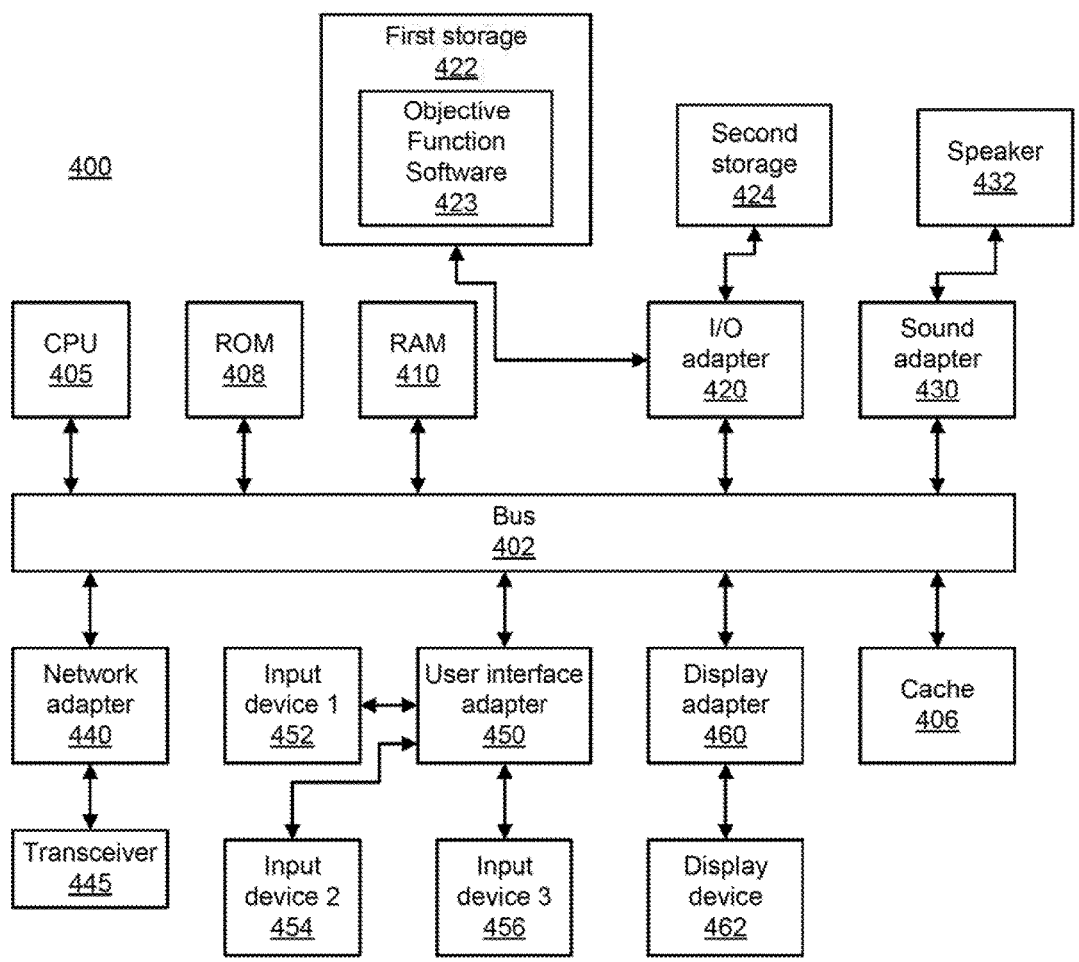
FIG. 4 is a block diagram illustrating a computer system, in accordance with an embodiment of the present invention.

Referring to FIG. 4, an exemplary computer system 400 is shown which may represent a system that finds the optimal capacity for a battery storage system or is a battery optimization device, in accordance with an embodiment of the present invention. The computer system 400 includes at least one processor (CPU) 405 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices. In one embodiment, the first storage device 422 or the second storage device 424 may include objective function software 425. The objective function software 425 may be able determine the optimal capacity of a battery storage system for a customer site based on utility information, customer power usage, and customer power generation.

A speaker 432 may be operatively coupled to system bus 402 by the sound adapter 430. A transceiver 445 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 452, 454, and 456 can be the same type of user input device or different types of user input devices. The user input devices 452, 454, and 456 are used to input and output information to and from system 400.

Of course, the computer system 400 may also include other elements (not shown), as readily contemplated by one of skill in the art, as well as omit certain elements. For example, various other input devices and/or output devices can be included in computer system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 400 are readily contemplated by one of ordinary skill in the art given the teachings of the present invention provided herein.

Figure 5:
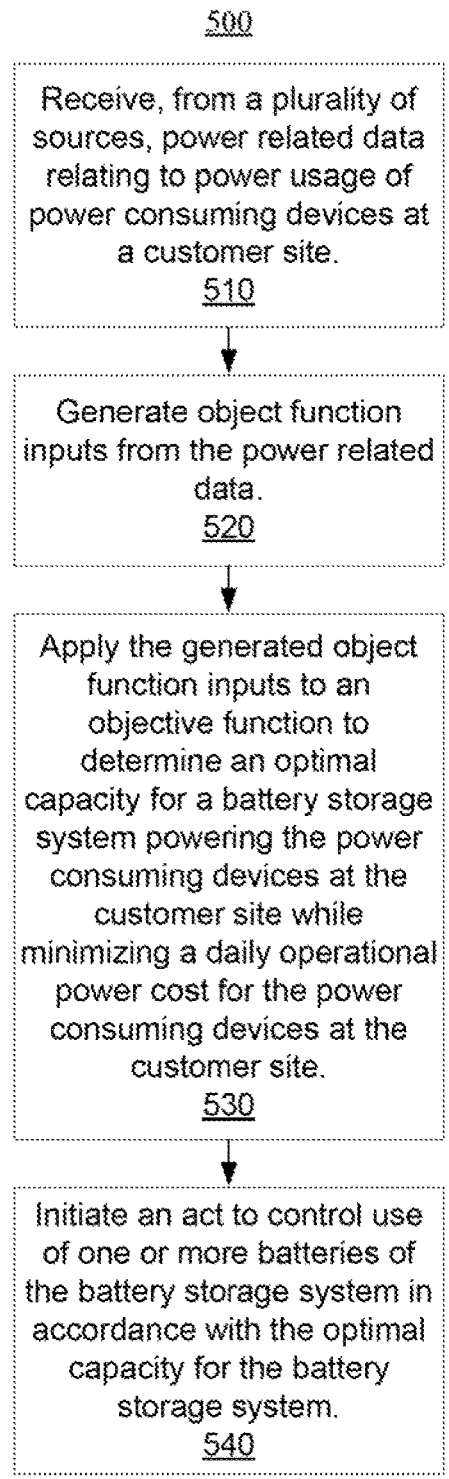
FIG. 5 is a flow diagram illustrating a method for determining the optimal capacity of a battery storage system, in accordance with an embodiment of the present invention.

Referring to FIG. 5, a flow chart for a method 500 of determine the optimal capacity of a battery storage system is illustratively shown, in accordance with an embodiment of the present invention. It is to be appreciated that the steps of method 500 may be performed on a server or other computer system. In block 510, receive, from a plurality of sources, power related data relating to power usage of power consuming devices at a customer site. In block 520, generate object function inputs from the power related data. In block 530, apply the generated object function inputs to an objective function to determine an optimal capacity for a battery storage system powering the power consuming devices at the customer site while minimizing a daily operational power cost for the power consuming devices at the customer site. In block 540, initiate an act to control use of one or more batteries of the battery storage system in accordance with the optimal capacity for the battery storage system.

Figure 6:
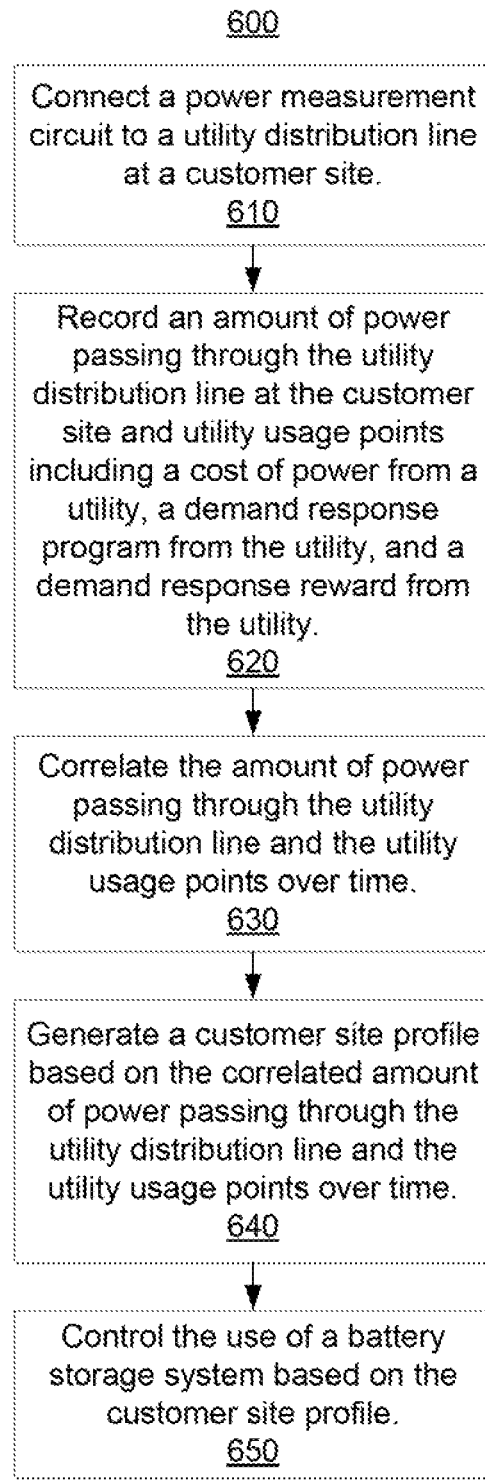
FIG. 6 is a flow diagram illustrating a method for generating and using a customer site profile for battery optimization, in accordance with an embodiment of the present invention.

Referring to FIG. 6, a flow chart for a method 600 of generating a customer site profile for battery optimization is illustratively shown, in accordance with an embodiment of the present invention. It is to be appreciated that the steps of method 600 may be performed on a battery optimization device. In block 610, connect a power measurement circuit to a utility distribution line at a customer site. In block 620, record an amount of power passing through the utility distribution line at the customer site and utility usage points including a cost of power from a utility, a demand response program from the utility, and a demand response reward from the utility. In block 630, correlate the amount of power passing through the utility distribution line and the utility usage points over time. In block 640, generate a customer site profile based on the correlated amount of power passing through the utility distribution line and the utility usage points over time. In block 650, control the use of a battery storage system based on the customer site profile.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method, comprising:
receiving, by a processor from a plurality of sources, power related data relating to power usage of power consuming devices at a customer site;
generating, by the processor, object function inputs from the power related data;
applying, by the processor, the generated object function inputs to an objective function to determine an optimal capacity for a battery storage system powering the power consuming devices at the customer site while minimizing a daily operational power cost for the power consuming devices at the customer site; and
initiating, by the processor, an act to control use of one or more batteries of the battery storage system in accordance with the optimal capacity for the battery storage system;
wherein the generated object function inputs to the objective function include event-day consumption data and non-event-day consumption data that is simultaneously optimized to determine the optimal capacity for the battery storage system while concurrently minimizing a daily operational power cost for the power consuming devices at the customer site;
wherein the event-day is a day when the customer is participating in a demand response program (DRP) and the non-event-day is a day when the customer is not participating in a DRP and any customer benefit from the DRP is related to the customer's consumption on non-event-days.

2. The method as recited in claim 1, wherein the objective function utilizes a single Mixed Integer Linear Programming (MILP) technique.

3. The method as recited in claim 1, wherein the objective function simultaneously considers demand response program requirements and demand charge requirements to determine the optimal capacity for the battery storage system.

4. The method as recited in claim 1, wherein the objective function employs different inequality constraints related to power generation and power demand balance, and to a maximum and a minimum battery state-of-charge (SOC).

5. The method as recited in claim 1, wherein the power related data includes a time of use price, a demand charge price, a load profile, a power generation system output, a demand response program, and a battery storage system cost.

6. The method as recited in claim 5, wherein the power generation system output is generated from a power generation system selected from the group consisting of a photovoltaic system, a wind farm system, a hydroelectric system, a biomass system, and a geothermal system.

7. The method as recited in claim 5, wherein the demand response program is selected from the group consisting of a demand bidding program and a scheduled load reduction program.

8. The method as recited in claim 1, wherein the plurality of sources are selected from the group consisting of a utility provider, a facility and a battery storage system provider.

9. The method as recited in claim 1, wherein the objective function uses the generated object function inputs from a finite period of time.

10. The method as recited in claim 9, wherein the finite period of time includes both demand response event days and demand response non-event days.

11. The method as recited in claim 10, wherein the generated object function inputs for the demand response event days includes a demand response reward.

12. The method as recited in claim 1, wherein the generated object function inputs includes a daily cost of energy from the utility provider, a daily cost of the demand charge from the utility provider, a daily cost of the energy storage capital expenditure, and a daily cost for the facility power generation system.

13. The method as recited in claim 1, wherein the objective function uses a generation and demand balance, a battery state of charge upper and lower limits, a battery state of charge equality at the beginning and end of each day, a power generation maximum limit and curtailment, and no reverse power to the grid.

14. The method as recited in claim 1, further comprising installing the battery storage system with the determined optimal capacity at the customer site to power the power consuming devices at a customer site.

15. A system, comprising:
a processor configured to:
receive, from a plurality of sources, power related data relating to power usage of power consuming devices at a customer site;
generate object function inputs from the power related data;
apply the generated object function inputs to an objective function to determine an optimal capacity for a battery storage system powering the power consuming devices at the customer site while minimizing a daily operational power cost for the power consuming devices at the customer site; and
initiate an act to control use of one or more batteries of the battery storage system in accordance with the optimal capacity for the battery storage system;
wherein the generated object function inputs to the objective function include event-day consumption data and non-event-day consumption data that is simultaneously optimized to determine the optimal capacity for the battery storage system while concurrently minimizing a daily operational power cost for the power consuming devices at the customer site;
wherein the event-day is a day when the customer is participating in a demand response program (DRP) and the non-event-day is a day when the customer is not participating in a DRP and any customer benefit from the DRP is related to the customer's consumption on non-event-days.

16. The system as recited in claim 15, wherein the objective function utilizes a single Mixed Integer Linear Programming (MILP) technique.

17. The system as recited in claim 15, wherein the objective function simultaneously considers demand response program requirements and demand charge requirements to determine the optimal capacity for the battery storage system.

18. The system as recited in claim 15, wherein the objective function employs different inequality constraints related to power generation and power demand balance, and to a maximum and a minimum battery state-of-charge (SOC).

* * * * *